United States Patent [19]

McCallister

[11] 4,032,472
[45] June 28, 1977

[54] MANUFACTURE OF ALUMINA SOL

[75] Inventor: Kenneth R. McCallister, Shreveport, La.

[73] Assignee: UOP Inc., Des Plaines, Ill.

[22] Filed: Jan. 7, 1976

[21] Appl. No.: 647,231

[52] U.S. Cl. .......................... 252/313 R; 252/317; 252/442; 252/463; 423/626

[51] Int. Cl.$^2$ ........................................ B01J 13/00

[58] Field of Search ............................... 252/313 R

[56] References Cited

UNITED STATES PATENTS

| | | | |
|---|---|---|---|
| 3,020,242 | 2/1962 | McCartney et al. | 252/313 R X |
| 3,340,205 | 9/1967 | Hayes et al. | 252/313 R |
| 3,535,268 | 10/1970 | Hayes | 252/313 R |

Primary Examiner—Richard D. Lovering
Attorney, Agent, or Firm—James R. Hoatson, Jr.; Robert W. Welch; William H. Page, II

[57] ABSTRACT

A sufficient amount of alumina is initially digested in aqueous hydrochloric or hydrofluoric acid to provide from about 5 to about 25 wt. % of the aluminum content of the desired alumina sol, and a finely divided aluminum is subsequently digested therein to provide the remaining required amount of alumina. The method enables the digestion reaction to be effected at an increased rate, and affords a sol of improved homogeniety and reproducibility.

5 Claims, No Drawings

MANUFACTURE OF ALUMINA SOL

Alumina sol is utilized almost exclusively in the manufacture of alumina. However, the alumina product finds extensive use in the chemical and petroleum industries as a treating and purifying agent, and especially as a catalyst or as a support for other catalytic materials.

The alumina sol may be converted to alumina in many ways, virtually all of which require gelation of the sol and formation of a hydrogel which, upon drying, calcining and other miscellaneous processing steps, is converted to the desired alumina. The alumina is prepared in many shapes and sizes depending on its intended use. For example, spheres are a particularly useful form, and spheres are advantageously prepared by the technique of dispersing alumina sol droplets into a hot oil bath. The droplets are retained in the bath until they set into firm hydrogel spheroids, the spheroids being thereafter separated from the bath and subjected to a specific aging treatment designed to promote the development of desirable physical properties. The spheres are subsequently dried, usually at a temperature of from about 35° to about 200° C., and thereafter calcined, generally at a temperature of from about 425° to about 750° C.

In the manufacture of catalyst comprising alumina, it is frequently desirable to include a chlorine and/or fluorine component to enhance the acid function of the catalyst with respect to certain hydrocarbon conversion reactions, and it is generally considered that the halogen component is present in a combined form. Although the addition of chlorine or fluorine can be effected by various methods, for example by treating the calcined alumina with hydrochloric and/or hydrofluoric acid, a convenient and preferred method comprises utilizing an alumina sol formed by digesting aluminum metal in hydrochloric and/or hydrofluoric acid. When necessary, the alumina subsequently produced therefrom may be treated with said acids as aforesaid to add additional halogen, or treated with steam to lower the halogen concentration.

The manufacture of alumina sol by the method whereby aluminum is disgested in aqueous hydrochloric or hydrofluoric acid has heretofore been effected by charging an excess of metallic aluminum to a digester together with water and said acid. The acidic solution is circulated in contact with the aluminum until a quantity has been digested in excess of that desired in the sol product. The resulting acidic sol is then separated from the digester and the aluminum and halogen concentration is adjusted to a desired level by the addition of hydrochloric and/or hydrofluoric acid thereto, the excess aluminum being retained in the digester as a portion of the subsequent aluminum charge thereto.

It has been recognized that the degree of subdivision of the aluminum reactant is a principal factor in determining the digestion rate; the smaller the particle size the greater the surface area in contact with the other reactants. Powdered aluminum would therefore appear to be ideal for use in the digestion process. However, due to the vigorous nature of the resulting reaction, the digestion process is difficult to effect in a controlled manner, and the practitioner has been relegated to the use of much larger aluminum particles, and to the use of a substantial excess thereof, to achieve effective control of the process.

In addition to a substantial slowing of the digestion process, the larger aluminum particles present an opportunity for the formation and accumulation of high molecular weight sol polymers detrimental to the sol product. For example, as has been previously shown, the residual acidic sol remaining on the aluminum particles after the separation of the sol product, continues to digest the aluminum with the formation of said high molecular weight sol polymers. But for an intermediate washing step, a sufficient amount of said polymers is recovered in each succeeding sol product to yield a sol with a tendency to stratify into several distinct layers indicative of a non-homogeneous sol, and the alumina product is non-uniform as to composition and/or physical properties.

It is an object of this invention to present an improvement in the manufacture of an alumina sol by the method whereby aluminum is digested in aqueous hydrochloric or hydrofluoric acid. It is a further object to present an improvement in said method enabling the use of a finely divided aluminum reactant to improve the digestion rate. It is another object of this invention to present an improvement in said method which obviates the formation of undesirable high molecular sol polymers and affords a sol of improved homogeniety and reproducibility.

In one of its broad aspects, the present invention embodies an improvement in the manufacture of an alumina sol containing combined chloride or fluoride and from about 13 to about 15 wt. % aluminum wherein metallic aluminum is digested in hydrochloric or hydrofluoric acid, the improvement comprising first digesting sufficient alumina in hydrochloric or hydrofluoric acid to provide from about 5 to about 25 wt. % of the aluminum content of said sol, and thereafter digesting a finely divided metallic aluminum therein to provide the required remaining amount of aluminum, said hydrochloric or hydrofluoric acid being employed in an amount to provide a sol containing combined chloride or fluoride in from about a 0.5 to about 2.0 atom ratio with the aluminum content thereof.

Other objects and embodiments of this invention will become apparent in the following detailed specification.

Pursuant to the present invention, sufficient alumina is first digested in hydrochloric and/or hydrofluoric acid to provide from about 5 to about 25 wt. % of the aluminum content of the finished sol product, the remaining required amount being provided by the addition of metallic aluminum to the resulting acidic reaction mixture. The alumina starting material may be any of the various hydrous aluminum oxides or alumina gels such as boehmite, bayerite, gibbsite, and the like. Activated aluminas, such as have been thermally treated at temperatures in excess of about 400° C with the elimination of at least a portion of the chemically and/or physically combined water and hydroxyl groups commonly associated therewith, are suitable starting materials. The high surface area gamma- and eta-aluminas prepared by the thermal treatment of boehmite and bayerite alumina respectively, generally at a temperature in the 400°–850° C. range, are particularly useful. The alumina product derived from the alumina sol of this invention is typically gamma-alumina, and the alumina starting material is advantageously a finely divided gamma-alumina resulting, at least in part, from the processing and breakage of, for example, the aforementioned calcined alumina spheres.

While higher or lower acid concentrations may be employed in the digestion process, a hydrochloric acid solution containing from about 10 to about 30 wt. % hydrogen chloride is most suitable for use in the present invention. Lower acid concentrations tend to extend the digestion process, and generally do not lend themselves to the dissolution of large quantities of alumina and/or aluminum.

After digesting alumina in the aqueous acidic solution, the metallic aluminum reactant is added to the acidic reaction mixture in an amount to provide from about 13 to about 15 wt. % aluminum therein. As heretofore noted, the degree to which the aluminum has been subdivided is a substantial factor determining the rate of digestion; the smaller the size of the particles, the greater the surface area exposed to the acidic solution and, therefore, the faster the rate of digestion. The improvement of this invention is particularly adapted to the use of a powdered aluminum to expedite the digestion process. Aluminum turnings, aluminum foil, or granulated aluminum may also be advantageously employed. Aluminum pellets which have been prepared by dropping molten aluminum into water have heretofore been employed, and may be used to advantage provided they are less than about ¼ inch in diameter.

Alumina sols of predetermined composition with respect to aluminum and chloride content are prepared by the process of this invention. It is usually preferred to maintain the chloride level of the sol product at from about 8 to about 12 wt. % thereof. Sols containing aluminum in excess of about 16 wt. % are highly unstable, and it is therefore preferable to maintain the aluminum content at from about 13 to about 15 wt. %. The aluminum/chloride weight ratio of the sol product, which influences the physical properties of the ultimate alumina product, is usually maintained at from about 0.5 to about 2.0, preferably from about 1.0 to about 2.0. The aluminum and chloride content of the sol, as well as the aluminum/chloride weight ratio, is substantially equivalent to the quantity and ratio of the aluminum-alumina and hydrochloric acid reactants charged to the digester and thus may be readily controlled.

Reaction conditions pertaining to the digestion process of this invention generally include a temperature of from about 50° to about 125° C., a temperature of from about 75° to about 105° being preferred. It is highly desirable to effect the digestion under liquid phase reaction conditions generally entailing the use of elevated pressures. Hydrogen, being a by-product of the digestion reaction, is advantageously employed to maintain a required pressure.

The improvement of the present invention affords a substantially faster digestion rate than heretofore practiced in the manufacture of an alumina sol for use in the production of alumina. This improvement precludes the formation of high molecular weight sol polymers and produces a sol having uniform physical appearance characteristics. Alumina produced from an alumina sol manufactured in accordance with the present invention possesses uniform physical properties and homogeniety of composition, particle to particle.

The following examples are presented in illustration of the improvement of this invention and are not intended as an undue limitation on the generally broad scope of the invention as set out in the appended claims.

EXAMPLE I

About 138 milliliters of concentrated hydrochloric acid was added to 263 milliliters of water in a glass vessel vented to the atmosphere through an overhead condenser. The vessel was equipped with a stirrer as well as heating and cooling means to maintain the reaction mixture at approximately 105° C. In this example, representing prior art methods, 71.5 grams of high purity (99.9%) aluminum nodules, average size about ¼ inch, were added to the acidic solution and digested therein — 72 hours being required to effect substantially complete digestion of the aluminum. The resulting alumina sol product analyzed 14.38 wt. % Al and 12.7 wt. % Cl for an Al/Cl atom ratio of 1.18. The specific gravity of the sol at 15.5° C. was 1.4372.

EXAMPLE II

In this example, representing one preferred embodiment of this invention, approximately 20.8 wt. % of the aluminum content of the sol product was derived from gamma-alumina, and the remainder from powdered aluminum. Thus, 138 milliliters of concentrated hydrochloric acid was added to 170 milliliters of water in the described glass vessel. The powdered alumina (28.04 grams) was added to the acidic solution and digested therein within 4.5 hours to yield a clear solution. After the addition of 83 milliliters of water to the reaction mixture, 56.7 grams of powdered aluminum was added thereto in increments, the rate of addition being determined by the heat of reaction. The addition and complete digestion of the aluminum was effected within about 6 hours, the total time required to produce the alumina sol being about 10.5 hours as opposed to the 72 hours of the preceding example. The resulting alumina sol product analyzed 14.27 wt. % Al and 11.69 wt. % Cl for an Al/Cl atom ratio of 1.22. The specific gravity of the sol at 15.5° C. was 1.4282. The product was a clear sol, free of the milky-white appearance indicative of the undesirable high molecular weight sol polymers, and the product showed no tendency towards stratification on standing.

I claim as my invention:

1. In the manufacture of an alumina sol containing combined chloride or fluoride and from about 13 to about 15 wt. % aluminum wherein metallic aluminum is digested in hydrochloric or hydrofluoric acid, the improvement which comprises first digesting sufficient solid alumina particles in hydrochloric or hydrofluoric acid to provide from about 5 to about 25 wt. % of the aluminum content of the sol product, and thereafter digesting metallic aluminum therein to provide the required remaining amount of aluminum, said hydrochloric or hydrofluoric acid being employed in an amount to provide a sol containing combined chloride or fluoride in from about a 0.5 to about a 2.0 atom ratio with the aluminum content thereof.

2. The improvement of claim 1 further characterized in that said metallic aluminum is a finely divided aluminum.

3. The improvement of claim 1 further characterized in that hydrochloric acid is employed in an amount to provide a sol containing combined chloride in from about a 1.0 to about a 2.0 atom ratio with the aluminum content thereof.

4. The improvement of claim 1 further characterized in that said alumina and said aluminum are digested at a temperature of from about 50° to about 125° C. and at a pressure to maintain substantially liquid phase reaction conditions.

5. The improvement of claim 1 further characterized in that said alumina and said aluminum are digested at a temperature of from about 75° to about 105° C. and at a pressure to maintain substantially liquid phase reaction conditions.

* * * * *